United States Patent [19]

Cymbaluk et al.

[11] Patent Number: 5,096,568
[45] Date of Patent: Mar. 17, 1992

[54] METALS PASSIVATION

[75] Inventors: Ted H. Cymbaluk; Chia-Min Fu, both of Bartlesville, Okla.

[73] Assignee: Phillips Petroleum Company, Bartlesville, Okla.

[21] Appl. No.: 682,792

[22] Filed: Apr. 8, 1991

Related U.S. Application Data

[62] Division of Ser. No. 504,778, Apr. 4, 1990, Pat. No. 5,037,786.

[51] Int. Cl.$^5$ .............................................. C10G 11/05
[52] U.S. Cl. ............................ 208/120; 208/52 CT; 208/121; 208/115; 208/113; 502/521
[58] Field of Search ............... 208/120, 52 CT, 121; 502/521

[56] References Cited

U.S. PATENT DOCUMENTS

| | | | |
|---|---|---|---|
| 3,711,422 | 1/1973 | Johnson et al. | 252/414 |
| 4,111,845 | 9/1978 | McKay | 252/455 Z |
| 4,595,771 | 6/1986 | Blaschke et al. | 556/77 |
| 4,595,772 | 6/1986 | Blaschke et al. | 556/77 |
| 4,609,747 | 9/1986 | Blaschke et al. | 556/77 |
| 4,814,066 | 3/1989 | Fu | 208/120 |
| 4,929,336 | 5/1990 | Lowery et al. | 208/120 |
| 4,935,121 | 6/1990 | Fu et al. | 208/120 |
| 4,954,244 | 9/1990 | Fu et al. | 208/120 |

FOREIGN PATENT DOCUMENTS 0295020  12/1988  European Pat. Off. .

OTHER PUBLICATIONS

"Comprehensive Inorganic Chemistry", vol. 2, by J. C. Bailar et al., 1973, Pergamon Press; pp. 642–644 and 1050–1052.

"Kirk–Othmer Encyclopedia of Chemical Technology", vol. 10, John Wiley & Sons, 1980, pp. 676 and 679.

*Primary Examiner*—Helane E. Myers
*Attorney, Agent, or Firm*—K. K. Brandes

[57] ABSTRACT

A zeolite-containing catalytic cracking catalyst having been passivated by treatment with an aqueous solution which has been prepared by mixing an antimony oxide, ammonium bifluoride and water, at an atomic ratio of F:Sb in excess of about 6:1, is used in a process for catalytically cracking a hydrocarbon-containing feed, in particular one which contains metal impurities. In one embodiment, the above-described aqueous solution is injected into the feed. In other embodiments, the solution is injected into the cracking zone or into a catalyst regeneration zone.

18 Claims, No Drawings

METALS PASSIVATION

This is a divisional application of copending application Ser. No. 504,778, filed Apr. 4, 1990.

BACKGROUND OF THE INVENTION

This invention relates to a process for treating a zeolite-containing cracking catalyst with an aqueous solution comprising an antimony compound so as to make the catalyst more resistant to the detrimental effects of metal poisons deposited thereon during catalytic cracking of hydrocarbon-containing oils. In another aspect, this invention relates to zeolite-containing cracking catalyst having been impregnated with an aqueous solution comprising an antimony compound. In a further aspect, this invention relates to a process for catalytically cracking a hydrocarbon-containing oil which contains metal impurities, wherein an aqueous solution comprising an antimony compound, is injected into the oil feed or, alternatively, into the cracking zone. In still another aspect, this invention relates to a process comprising catalytically cracking a metal-contaminated hydrocarbon-containing oil, separating cracked products from spent catalyst, and regenerating the spent catalyst for recycle to the catalytic cracking zone, wherein an aqueous solution comprising an antimony compound is injected into a catalyst regeneration zone.

It is well known to use antimony compounds as passivating agents for zeolite-containing cracking catalysts so as to mitigate the detrimental effects of metal poisons (primarily nickel/vanadium compounds) deposited thereon. Some of these antimony compounds are water soluble, such as those disclosed in U.S. Pat. Nos. 3,711,422; 4,595,771; 4,595,772 and 4,609,747. It is frequently more practical to employ an aqueous solution of an antimony compound as passivating agent rather than a solution of an antimony compound in a flammable organic solvent, especially if the passivating agent is to be injected into a hot oxidative catalyst regeneration zone. The use of aqueous solution essentially eliminates the danger of an explosion which exists when a highly flammable solution is used. The present invention is directed to the use of an aqueous solution comprising an antimony compound which is more effective than known aqueous antimony-containing metal passivating agents. The term "metals passivating", as used herein, implies that the detrimental effects during catalytic cracking (in particular excessive hydrogen generation and/or lower gasoline yields) caused by metal deposits (such as compounds of Ni, V and Cu) on a cracking catalyst composition have been mitigated.

SUMMARY OF THE INVENTION

It is an object of this invention to provide a process for passivating a catalytic cracking catalyst composition. It is another object of this invention to provide a passivated catalytic cracking catalyst composition. It is a further object of this invention to provide a catalytic cracking process employing a passivated catalytic cracking catalyst composition. It is still another object of this invention to employ an aqueous passivating agent in a catalytic cracking process. Other objects and advantages will become apparent from the detailed disclosure and the appended claims.

In accordance with this invention, a zeolite-containing cracking catalyst composition is contacted (treated) with an aqueous solution prepared by mixing an antimony oxide (preferably $Sb_2O_3$), ammonium bifluoride ($NH_4HF_2$) and water, followed by substantially drying the thus-contacted catalyst composition. The atomic ratio of F:Sb in the solution can be varied over a wide range.

In one mode of operation, a fresh zeolite-containing catalytic cracking catalyst composition is contacted (treated) with the aqueous solution described above. In another mode of operation, a regenerated, used (spent), metal-contaminated spent zeolite-containing catalytic cracking catalyst is contacted with the aqueous solution described above. In a further mode of operation, a mixture of a fresh zeolite-containing catalytic cracking catalyst composition and a regenerated, used (spent) metal-contaminated zeolite-containing cracking catalyst composition is contacted with the aqueous solution described above.

Also in accordance with this invention, there is provided a zeolite-containing catalytic cracking catalyst having been contacted (treated) with the aqueous solution described above (by either one of the three contacting modes).

Further in accordance with this invention, a process for catalytically cracking a hydrocarbon-containing feed, particularly one which contains metal impurities, comprises contacting said feed under catalytic cracking conditions, substantially in the absence of added free hydrogen, with a catalytic cracking catalyst composition having been contacted (treated) with the aqueous solution described above (by either one of the three contacting modes).

Still further in accordance with this invention, a process for catalytically cracking a hydrocarbon-containing feed, particularly one which contains metal impurities, in the presence of a zeolite-containing cracking catalyst, substantially in the absence of added free hydrogen, comprises injecting the aqueous solution described above into the feed or, alternatively, into the catalytic cracking zone.

Additionally in accordance with this invention, there is provided a combination process comprising catalytically cracking (substantially in the absence of added free hydrogen) a hydrocarbon-containing feed (as described above), separating liquid and gaseous cracked products from the spent (used) zeolite-containing catalytic cracking catalyst, stripping adhered hydrocarbons from the thus-separated spent catalytic cracking catalyst, heating the stripped spent catalytic cracking catalyst in a regeneration zone with a free oxygen containing gas (so as to burn off coke deposits), and recycling at least a portion of the regenerated catalytic cracking catalyst to the cracking zone; wherein the aqueous solution described above is injected either directly into the regeneration zone or, alternatively, into a conduit leading to or from the regeneration zone, so as to deposit the solute contained in the aqueous solution (described above) onto the spent cracking catalyst.

DETAILED DESCRIPTION OF THE INVENTION

The term "catalytic cracking", as used herein, implies that essentially no hydrocracking occurs and that the catalytic cracking process is carried out with a hydrocarbon-containing oil feed substantially in the absence of added hydrogen gas, under such conditions as to obtain at least one liquid product stream having a higher API gravity (measured at 60° F.) than the feed. The term "spent", as used herein, implies that at least a portion of the zeolite-containing cracking catalyst composition has been used in a process for catalytically cracking hydrocarbon-containing oils, in particular those containing metal (Ni, V, Cu) impurities, and has then been regenerated by stripping adhered oil from the catalyst composition (such as by steam-stripping) and subsequent heating in an oxidizing gas atmosphere (such as air) so as to burn off coke deposits on the catalytic cracking catalyst composition.

The aqueous solution used in the processes of this invention can be prepared by mixing, in any order, water, an antimony oxide ($Sb_2O_3$ or $Sb_2O_5$ or the like or combinations thereof, preferably $Sb_2O_3$) and ammonium bifluoride ($NH_4HF_2$) in such proportions as to obtain a substantially clear solution. It is also possible to use $NH_4F$ and HF at an approximately equimolar ratio in lieu of $NH_4HF_2$. It is also within the scope of the invention (yet presently not preferred) to have minor amounts of undissolved, dispersed antimony oxide present in the solution. Generally, the atomic ratio of F to Sb in the solution is in the range of from about 6:1 to about 30:1. But preferably, this atomic ratio exceeds about 6:1, and more preferably is in the range of from about 7:1 to about 25:1. The fluoride and antimony components in the solution can be present in the solution in any suitable concentration. Generally, the antimony concentration in the solution is in the range of from about 3 to about 30 weight-% Sb, and preferably is about 5-20 weight-% Sb.

Any zeolite-containing catalytic cracking catalyst can be used in the processes of this invention. The zeolite component of the spent zeolite-containing cracking composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749.

Generally, the zeolite component of the catalytic cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the zeolite/matrix cracking catalyst composition is in the range of from about 100 to about 800 $m^2/g$. Generally, the weight ratio of zeolite to matrix material in the catalytic cracking catalyst composition is in the range of from about 1:20 to about 1:1.

The catalytic cracking catalyst composition used in the processes of this invention can be fresh (unused) or can be spent. Any spent zeolite-containing catalytic cracking catalyst composition, which contains at least one metal contaminant (i.e., at least one compound of Ni and/or V and/or Cu) and at least a portion of which has previously been used in a catalytic cracking process and has been oxidatively regenerated, can be used. The catalytic cracking catalyst composition can contain any portion of such regenerated spent catalyst composition, ranging from 100% to about 10 weight-% (i.e., containing 0% to about 90 weight-% fresh, unused zeolite-containing cracking catalyst composition). Equilibrium cracking catalysts, which are commonly employed in commercial catalytic cracking operations and generally comprise a physical blend of regenerated, used (spent) cracking catalyst composition and fresh (unused) catalytic cracking catalyst composition, are particularly suited for the processes of this invention. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) catalytic cracking catalyst composition.

The contacting of the zeolite-containing catalytic cracking catalyst composition and the aqueous solution prepared from antimony oxide and $NH_4HF_2$ (described above) can be carried out in any suitable manner. It can be done in a vessel, preferably with agitation. Or it can be done continuously, such as by passing the aqueous solution through a column filled with a cracking catalyst composition. Or the aqueous solution can be sprayed onto the catalytic cracking catalyst composition.

Any suitable time of contact between solution and the cracking catalyst composition can be employed, generally from about 0.1 to about 5 hours. Any suitable temperature can be employed in the contacting step, generally from about 10° C. to about 300° C. (preferably about 60°-90° C.), generally at ambient pressure (1 atm). The weight ratio of the aqueous solution (described above) to the zeolite-containing catalytic cracking catalyst composition is generally chosen so as to provide a treated catalyst composition possessing a level of about 10 ppm Sb (parts by weight Sb per million parts by weight catalyst) to about 5 weight-% Sb, preferably about 0.1-2 weight-% Sb, based on the weight of dry catalyst composition. Generally, the fluoride content in the treated catalyst composition is such as to provide an atomic ratio of F:Sb in the catalyst of from about 6:1 to about 30:1. Preferably, this ratio exceeds about 6:1. More preferably, this ratio is about 7:1 to about 25:1, most preferably about 10:1 to about 15:1.

The thus-treated catalytic cracking catalyst composition (now containing Sb and F) is dried, preferably at about 80°-120° C. for about 0.5-10 hours. Generally, the water content in the substantially dried catalyst composition is less than about 5 weight-% $H_2O$ (preferably less than 2 weight-% $H_2O$). If the contacting of the catalytic cracking catalyst composition with the aqueous solution is carried out with a hot catalyst composition (e.g., one which is present in or exits from the oxidative regenerator of a catalytic cracking unit), a separate drying step can be omitted, because the drying occurs in the contacting zone containing the hot catalyst. Thus, it is within the scope of this invention to have the contacting and drying steps occur substantially simultaneously. Optionally, the substantially dried, treated catalytic cracking composition can be calcined at a higher temperature (i.e., above 200° C.); however, this calcining step generally is not needed.

The catalytic cracking catalyst composition which has been contacted with the aqueous solution (prepared from antimony oxide and ammonium bifluoride) can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The treated catalyst composition can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D1160) in excess of about 400° F., preferably a boiling range of from about 400° to about 1200° F.. more preferably a range of from about 500° to about 1100° F., measured at atmospheric pressure conditions and contains metal impurities. The API gravity (measured at 60° F.) generally is in the range of from about 5 to about 40, preferably from about 10 to about 35. Generally, these feedstocks contain Ramsbottom carbon residue (ASTM D524; usually about 0.1-20 weight-%), sulfur (generally about 0.1-5 weight-% S), nitrogen (generally about 0.05-2 weight-% N), nickel (generally about 0.05-30 ppm Ni, i.e., parts by weight of Ni per million parts by weight of feed), vanadium (generally about 0.1-50 ppm V) and copper (generally about 0.01-30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally a catalyst regeneration unit (for removal of coke deposits) is combined with the FCC cracking unit, as is shown in the above-cited patents.

Specific operating conditions of the cracking operation greatly depend on the type of feed, the type and dimensions of the cracking reactor and the oil feed rate. Examples of operating conditions are described in the above-cited patents and in any other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used cracking catalyst composition from gaseous and liquid cracked products and separation of cracking products into various gaseous and liquid product fractions can be carried out by any conventional separation means. The most desirable product fraction is gasoline (ASTM boiling range: about 180°-400° F.). Non-limiting examples of such separation schemes are showing in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the catalyst treating process of this invention, described above, and thereafter be recycled to the catalytic cracking reactor, generally in admixture with fresh (unused) cracking catalyst.

In one embodiment of this invention, the aqueous solution (prepared from antimony oxide and ammonium bifluoride; described above) is injected into the hydrocarbon-containing feed stream before it enters the catalytic cracking reactor. The amount of the injected aqueous solution is chosen such that the cracking catalyst in the cracking zone contains about 10 ppm to about 5 weight-% Sb (preferably about 0.1-2 weight-% Sb). In another (yet less preferred) embodiment, the aqueous solution is directly injected into catalytic cracking reactor.

In a particularly preferred embodiment, the aqueous solution described above is injected into the oxidative regenerator, so that the solution comes in contact with the hot spent catalyst and the solute contained in the solution deposits on the catalyst. The aqueous solution is injected at such a rate as to provide a level of about 10 ppm to about 5 weight-% Sb, preferably about 0.1-2 weight-% Sb, in the regenerated cracking catalyst composition. Generally, the atomic ratio of F:Sb on the thus-treated regenerated cracking catalyst composition is in the range of from about 6:1 to about 30:1, but preferably exceeds about 6:1. More preferably, this atomic ratio is about 7:1 to about 25:1, most preferably about 10:1 to about 15:1. It is within the scope of this invention to inject the aqueous solution into a catalyst-transporting conduit leading to the regenerator or, alternatively, from the regenerator. The thus-treated regenerated catalytic cracking catalyst composition can be recycled, optionally admixed with fresh (treated or untreated) catalytic cracking catalyst composition, to the catalytic cracking zone.

The following examples are presented to further illustrate this invention and are not to be considered as unduly limiting the scope of this invention.

EXAMPLE I

This example illustrates the preparation of the aqueous passivating agent of this invention and its use for treating a used catalytic cracking catalyst composition which contains metal deposits.

About 14.2 g (0.25 mole) $NH_4HF_2$ (ammonium bifluoride; provided by Mallinckrodt, Inc., St. Louis, Mo.) was dissolved in about 40 cc water. To the aqueous solution was added, with heating and stirring for about 20 minutes, about 12.0 g (0.041 mole) $Sb_2O_3$. The slightly turbid solution was filtered through a coarse frit. The atomic ratio of F:Sb in this solution, labeled Solution A, was about 6:1.

Another solution, labeled Solution B, was prepared as described for Solution A, except that 28.4 g (0.5 mole) NH$_4$HF$_2$ and 65 cc water was used. Thus, the atomic ratio of F:Sb in Solution B was about 12:1. The pH of this solution was 6.

The above-described solutions were used to treat a zeolite-containing equilibrium catalytic cracking composition which was a blend of fresh cracking catalyst and of spent cracking catalyst (having been used and regenerated in a FCC cracking operation at a refinery of Phillips Petroleum Company). The equilibrium catalyst composition (labeled "J-8802") contained about 25 weight-% zeolite, which was embedded in a silica-alumina matrix, 0.18 weight-% Ni, 0.32 weight-% V, 0.53 weight-% Fe, 0.01 weight-% Cu, 0.06 weight-% Sb, and 0.34 weight-% Na. "J-8802" had a surface area of about 110 m$^2$/g, a total pore volume of 0.18 cc/g, an apparent bulk density of 0.90 g/cc, and a zeolite unit cell size of 24.34 Å.

50 grams of catalyst composition "J-8802" was impregnated with 0.25 g of Solution A (diluted with 25 cc water). The thus-treated catalyst composition was dried at about 250° C. and calcined in air for 1 hour at about 1250° F. The thus-treated catalyst material contained about 1000 ppm Sb.

Another 50 gram sample of "J-8802" was impregnated with 0.33 g of Solution B (diluted with 25 cc water), dried and calcined, as described above. Again, the thus-treated catalyst material contained about 1000 ppm Sb.

A third 50 g sample of "J-8802" was impregnated with a mixture of 163 cc water and 0.155 g Phil-Ad CA 6000 (an aqueous dispersions of Sb$_2$O$_5$, containing 22 weight-% Sb, marketed by Phillips Petroleum Company, Bartlesville), dried and calcined, as described above. The thus-treated catalyst material contained 1000 ppm Sb.

Finally, a sample of "J-8802" was impregnated with an aqueous solution of antimony tartrate, dried and calcined (as described above), at such conditions as to give an antimony level of 5000 ppm Sb.

EXAMPLE II

This example illustrates the performance of the antimony-treated cracking catalysts described in Example I in a catalytic cracking test reactor.

The test reactor was a MCBU (micro-confined bed unit) cracking test reactor, substantially in accordance with the procedure of Example II of U.S. Pat. No. 4,794,095. Cracking test conditions comprised a temperature of about 950° F., a catalyst to oil weight ratio of 6:1, and the use of a hydrotreated residuum as oil feed having API gravity (at 60° F.) of 18.7, sulfur content of 0.53 weight-%, basic nitrogen content of 0.09 weight-%, Conradson carbon content of 6.07 weight-%, nickel content of 10.6 ppm and vanadium content of 12.7 ppm. Average test results of at least two duplicate runs for each catalyst are summarized in Table I.

TABLE I

| Treating Agent for Catalyst | ppm Sb on Catalyst | Average Conversion (Wt % of Feed) | Average Gasoline Yield[1] | Average Hydrogen Generation[2] |
| --- | --- | --- | --- | --- |
| Solution A (6:1 Ratio of F:Sb) | 1000 | 75.3 | 50.3 | 293 |
| Solution B (12:1 Ratio of F:Sb) | 1000 | 76.7 | 50.3 | 319 |
| Phil-Ad 6000 | 1000 | 75.5 | 50.0 | 337 |
| Sb Tartrate in H$_2$O | 5000 | 76.5 | 50.5 | 305 |
| None | 0 | 74.0 | 48.0 | 395 |

[1] weight % of converted feed
[2] standard cubic feet H$_2$ per barrel of converted feed.

Test results in Table I clearly show the advantage of Solutions A and B, prepared by dissolving Sb$_2$O$_3$ and NH$_4$HF$_2$ in water, as passivating agent over an aqueous dispersion of Sb$_2$O$_5$ and an aqueous solution of Sb tartrate:lower H$_2$ generation at equivalent Sb loading. As is shown above, the Sb tartrate treated catalyst material contained five times more Sb than the catalyst material which had been treated with Solutions A and B. Treatment with Solution B (12:1 atomic ratio of F:Sb) resulted in a higher conversion than treatment with Solution A (6:1 atomic ratio of F:Sb). Thus, it is presently preferred to employ solution having a F:Sb atomic ratio in excess of about 6:1.

Attempts to prepare stable solutions of SbF$_3$ in water were not successful because SbF$_3$ hydrolyzed and formed a precipitate (probably SbOF or hydrated antimony oxide).

Reasonable variations, modifications and adaptations for various conditions and uses can be made within the scope of the disclosure and appended claims.

That which is claimed is:

1. A process for catalytically cracking a hydrocarbon containing feed which contains metal impurities comprising contacting said feed under catalytic cracking conditions in a cracking reactor, substantially in the absence of added free hydrogen, with a zeolite-containing catalytic cracking catalyst composition which has been treated with an aqueous solution having been prepared by mixing antimony oxide, ammonium bifluoride and water, followed by substantially drying the thus-treated catalyst composition; wherein the atomic ratio of F:Sb in said aqueous solution and in said thus-treated catalyst composition exceeds about 6:1.

2. A process in accordance with claim 1, wherein said antimony oxide is Sb$_2$O$_3$.

3. A process in accordance with claim 1, wherein said atomic ratio of F:Sb is in the range of from about 7:1 to about 25:1.

4. A process in accordance with claim 1, wherein said antimony oxide is Sb$_2$O$_3$, and said atomic ratio of F:Sb is in the range of from about 10:1 to about 15:1.

5. A process in accordance with claim 1, wherein the antimony concentration in said aqueous solution is in the range of from about 3 to about 30 weight-% Sb.

6. A process in accordance with claim 1, wherein said zeolite-containing catalytic cracking catalyst composition is a fresh catalyst composition.

7. A process in accordance with claim 1, wherein said zeolite-containing catalytic cracking catalyst composition is a spent catalyst composition which contains at least one metal contaminant selected from the group consisting of compounds of nickel, vanadium and copper.

8. A process in accordance with claim 1, wherein said zeolite-containing catalytic cracking catalyst composition is a mixture of (a) a fresh catalyst composition and (b) a spent catalyst composition which contains at least one metal contaminant selected from the group consisting of nickel, vanadium and copper.

9. A process in accordance with claim 1, wherein said thus-treated catalyst composition contains about 10 ppm to about 5 weight-% antimony.

10. A process in accordance with claim 1 wherein said feed has an API gravity of about 5 to 40.

11. A process in accordance with claim 10, wherein said metal impurities are present in said feed at a level of about 0.05–10 ppm nickel and about 0.1–50 ppm vanadium.

12. A process in accordance with claim 11, wherein said feed also comprises about 0.01–30 ppm copper.

13. A process in accordance with claim 1, wherein said aqueous solution has been injected into said feed.

14. A process in accordance with claim 1, wherein said aqueous solution has been injected into said cracking reactor.

15. A process in accordance with claim 1 comprising the additional steps of separating liquid and gaseous cracked products from spent catalytic cracking catalyst composition, stripping adhered hydrocarbons from the thus-separated catalytic cracking catalyst composition, heating the thus-stripped catalytic cracking catalyst composition in a regeneration zone with a free oxygen, and recycling at least a portion of the thus-regenerated catalytic cracking catalyst composition to said catalytic cracking zone.

16. A process in accordance with claim 15, wherein said aqueous solution has been injected into the said regenerating zone.

17. A process in accordance with claim 15, wherein said aqueous solution has been injected into a conduit leading to said regenerating zone.

18. A process in accordance with claim 15, wherein said aqueous solution has been injected into a conduit leading from said regenerating zone.

* * * * *